June 30, 1964     H. ALLEMANN     3,139,177
WORKPIECE HOLDER TABLE ARRANGEMENT
Filed Dec. 26, 1961     5 Sheets-Sheet 1
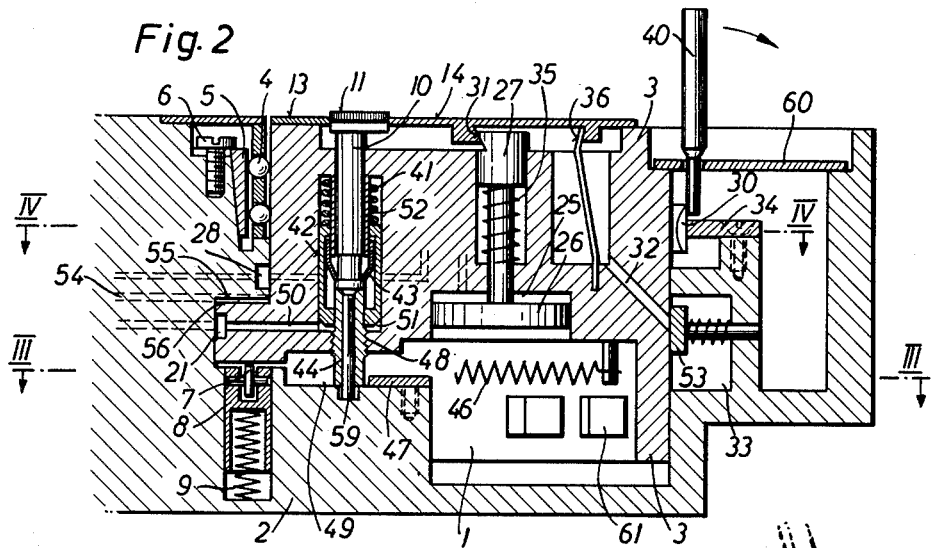
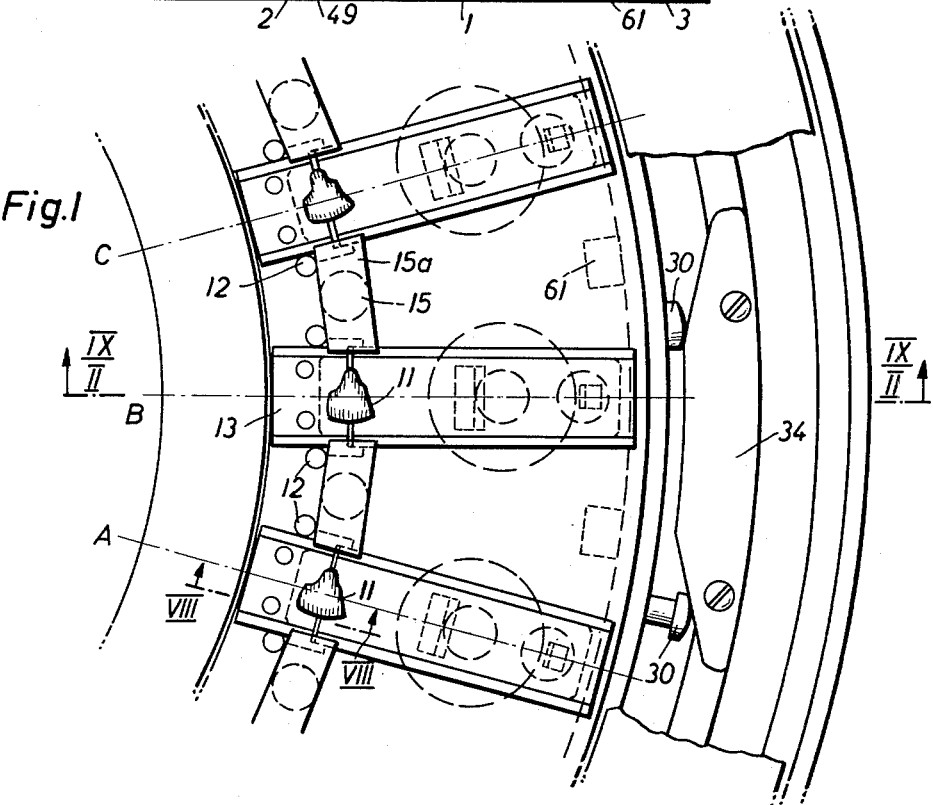
INVENTOR
Hugo Allemann
BY
Michael S. Striker
his attorney

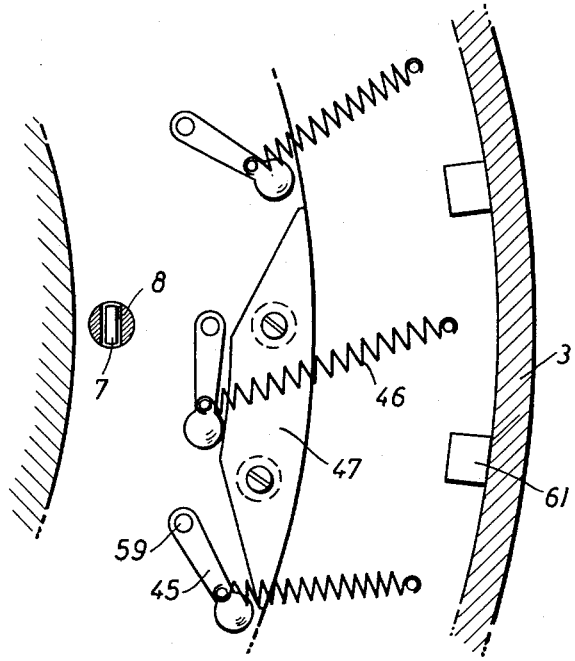
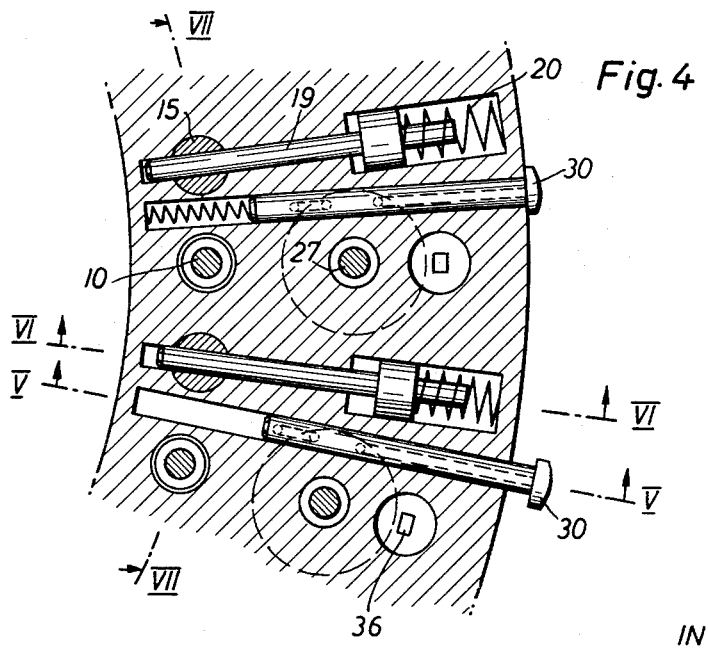

June 30, 1964   H. ALLEMANN   3,139,177
WORKPIECE HOLDER TABLE ARRANGEMENT

Filed Dec. 26, 1961   5 Sheets-Sheet 3

INVENTOR
Hugo Allemann
BY
Michael S. Striker
his attorney

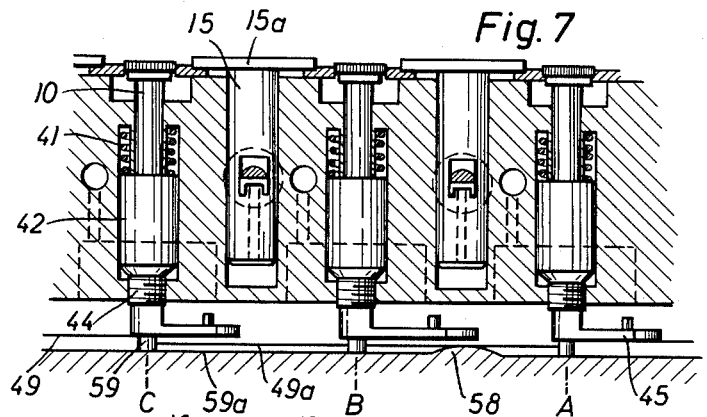
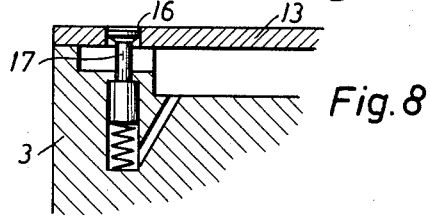
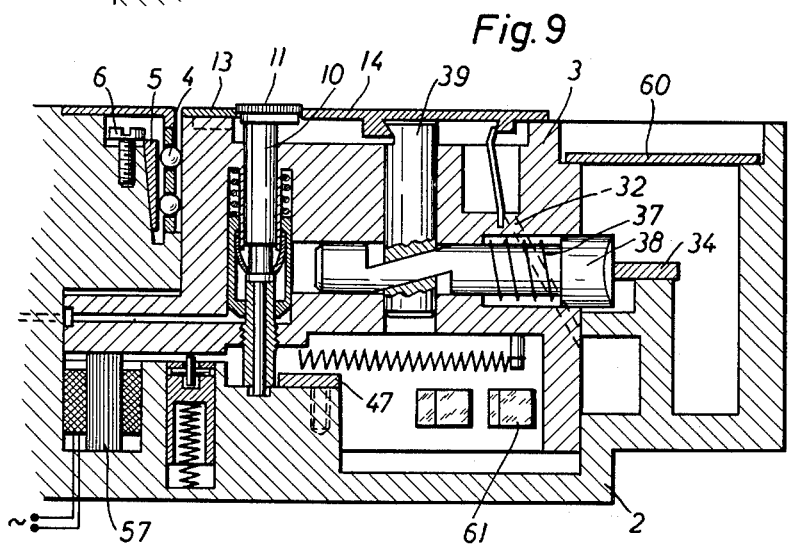

United States Patent Office 3,139,177
Patented June 30, 1964

3,139,177
WORKPIECE HOLDER TABLE ARRANGEMENT
Hugo Allemann, Schaanwald-Mauren, Liechtenstein, assignor to Etablissement Allemann, Schaanwald-Mauren, Liechtenstein
Filed Dec. 26, 1961, Ser. No. 162,051
Claims priority, application Austria Dec. 27, 1960
22 Claims. (Cl. 198—210)

The present invention relates to a workpiece holder table arrangement, and more particularly to an apparatus for automatically actuating tool holding means on the moving work table of a machine tool.

In machine tools of the type in which a plurality of identical workpieces are simultaneously held in a plurality of tool holders, while operations are carried out on the workpieces, the exact positioning of all workpieces, and consequently the precise function of the workpiece holders are of great importance, since otherwise the tools acting on the workpieces will not produce a series of precisely machined identical workpieces. In constructions of the prior art, the adjustment of the tool holders, and the mounting of the workpieces in the tool holders is a time-consuming operation requiring very careful attention, which is a disadvantage in mass production.

It is one object of the present invention to overcome the disadvantages of workpiece holder arrangements according to the prior art, and to provide a workpiece holder arrangement which automatically effects successive actuation of a series of workpiece holders at a control station so that the workpiece can be removed from each tool holder, and replaced by another workpiece without manual adjustment of the workpiece holders.

Another object of the present invention is to clamp, and simultaneously support, each workpiece in holding means mounted on a movable work table, and to move the holding means successively past a control station where each holding means is automatically opened to release the workpiece, and then again automatically placed in the workpiece holding position.

Another object of the present invention is to control the workpiece holding means through cam controlled operating means.

Another object of the present invention is to provide a workpiece holder table arrangement in which the workpiece holders are operated by hydraulic pistons.

With these objects in view, one embodiment of the invention comprises supporting means; a support, for example a circular work table, mounted on the supporting means for movement along a path; a plurality of workpiece holding means for holding and supporting flat workpieces on the table; and control means, for example cam means, for actuating the holding means and being located in the region of the path of movement of the holding means. Consequently, the control means are successively passed by each of the holding means, and actuate the holding means to move to a workpiece releasing position, and then back to a workpiece holding position so that a finished workpiece can be removed, and a new workpiece can be placed in each holding means as the same passes through a control station.

In the preferred embodiment of the invention, the holding means includes two holding plates located in a plane, and a workpiece support supporting a flat workpiece clamped along its outline between the holding plates. One of the holding plates is movable, and this movable holding plate, as well as the workpiece support, are shifted by mechanical, electrical, or hydraulic operating means when the same are actuated by a cam follower engaging cam means at the control station. The cam controlled devices are biased by spring means so as to return to a home position after actuation under the control of the cam means.

In one embodiment of the invention, the work table is mounted on stationary supporting means by resilient means, and is pressed down by hydraulic devices so that the height of the workpieces in the holders is exactly determined. In another embodiment of the invention, electric means are used for holding the work table at a desired height.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary plan view illustrating a sector of a workpiece holder table arrangement according to one embodiment of the invention;

FIG. 2 is a sectional view taken on line II—II in FIG. 1;

FIG. 3 is a sectional view taken on line III—III in FIG. 2;

FIG. 4 is a sectional view taken on line IV—IV in FIG. 2;

FIG. 7 is a sectional view taken on line VII—VII in FIG. 4;

FIG. 8 is a sectional view taken on line VIII—VIII in FIG. 1;

FIG. 9 is a sectional view corresponding to FIG. 8, but illustrating a modified embodiment of the invention;

Figure 5:
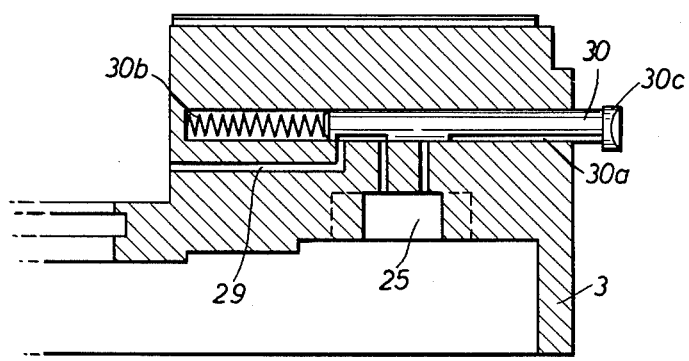
FIG. 5 is a sectional view taken on line V—V in FIG. 4.

Referring now to the drawings, and more particularly to FIGS. 1 to 8, a stationary supporting means 2 has an annular recessed space 1 in which a circular support or work table 3 is mounted for rotation about the center thereof. Ball bearings 4 laterally support the work table, which rests on supporting rollers 7. A ring 5 having a wedge shaped cross section is engaged by the balls of ball bearings 4, and the position of ring 5 can be adjusted by screws 6 passing through slots in an inwardly projecting flange of ring 5. In this manner, work table 3 can be exactly centered.

The supporting rollers are turnably mounted in piston-like support members 8 which are biased in upward direction by springs 9. Springs 9 have sufficient force to urge work table 3 away from the confronting surfaces of supporting means 2. During operations in which work table 3 has to be at a certain level, an operating fluid is pressed through a conduit 54 into a gap between the surfaces 55 and 56 of members 2 and 3 so that springs 9 are compressed by the downwardly moved table 3. During turning movement of table 3, however, the pressure of the operating fluid is relieved so that table 3 can freely move on the turning supporting rollers 7.

In the modified arrangement of FIG. 9, electromagnetic means 57 are provided for pulling work table 3 down and for compressing springs 9 until confronting faces of work table 3 and supporting means 2 abut each other whereby the table is fixed at a desired level.

A series of circumferentially spaced workpiece holding means is provided on work table 3. Each holding means includes a fixed plate 13, and a radially movable plate 14 which have clamping edges defining in the workpiece holding position the outline of a flat workpiece 11.

Springs 36 are secured to table 3 and resiliently engage projections on the movable holding plate 14 to urge the same outwardly into a position releasing the workpiece.

The fixed holding plates are centered by pairs of guide pins 12, and clamped down by clamping plates 15a extending between adjacent holding means. Clamping plates 15a press against lateral projections of holding plates 13 and guide the movable holding plates 14. The fixed holding plate 13 has two bores 16 which are used for receiving corresponding guide pins of a tool holder, not shown, so that the same is exactly positioned with respect to the workpiece 11. Bores 16 are normally closed by spring-loaded pins 17, as shown in FIG. 8. When the guide pins of the tool holder are inserted into bores 16, pins 17 are depressed. Pins 17 have piston portions mounted in corresponding cylinder portions in work table 3, and can be operated by an operating fluid under pressure to push the guide pins of the tool holder out of bores 16.

Figure 6:
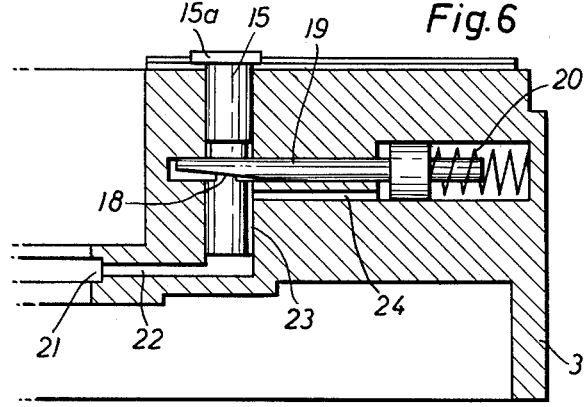
FIG. 6 is a sectional view taken on line VI—VI in FIG. 4.

The clamping plates 15a are the heads of pistons 15, as best seen in FIG. 6. Each piston 15 has a transverse cutout with a cam follower portion 18, on which the slanted surface of a wedge member 19 slides. Wedge member 19 has a piston portion moving in a cylinder of table 3, and is urged by spring 20 to an advanced position in which clamping member 15, 15a is pulled down so that the holding plate 13 is clamped. An annular recess 21 is provided in an inner circular face of table 3 and contains an operating fluid, such as oil. The annular recess 21 communicates through a duct 22 with a cylinder portion receiving a piston portion of member 15, and through a channel 23 in the piston portion of member 15 with another duct 24 communicating with the cylinder in which the piston portion of wedge member 19 is located. When fluid under pressure enters ducts 22, 23 and 24, wedge member 19 is withdrawn to release clamping member 15, and at the same time clamping member 15 is pressed upwardly so that clamping plate 15a releases the respective holding plate 13, as best seen in FIG. 7. Holding plates 13 have lateral projections, as shown in FIG. 1 in broken lines in which the movable holding plates 14 are guided and centered. Clamping plates 15a clamp only holding plates 13, but permit radial movement of holding plates 14.

Each movable holding plate 14 has an inner projection with a slanted guide face 31 engaged by a corresponding guide face of a operating member 27 which is biased by a spring 35 to move upwards to a position permitting outward movement of holding plate 14 by spring 36.

Each operating member 27 has a piston portion 26 which is operated when a pressure fluid is supplied to the space 25. An annular recess 28 is provided in the center portion of supporting means 2, and communicates with ducts 29, as best seen in FIG. 5. An operating slide valve member 30 is correlated with each operating member 27, 26 and controls by a groove 30a the flow of pressure fluid from duct 29 into the space 25. A spring 30b urges member 30 in outward direction so that its head 30c is normally located in the position shown for the lower member 30 in FIG. 1.

A control cam means 34 is fixed on supporting means 2 in the region of a control station B located between the last working station A and the first working station C. While a holding means passes through the control station B, cam 34 pushes operating member inwardly, displacing groove 30a, and separating space 25 from the source of pressure fluid. Consequently, spring 35 moves operating member 26, 27 upwardly to a releasing position in which spring 36 retracts the movable holding plate 14 at the control station, permitting removal of a finished workpiece.

At the working stations, of which only the last station A and the first station C are shown, the pressure in spaces 25 pulls member 27 down, so that holding plate 14 is moved inwardly into a workpiece holding position. At the same time, holding plate 14 is pressed down against working table 3 due to the vertical component of the force acting on the slanted face 31.

The space underneath holding plates 13 and 14 in table 3 is filled with oil, and connected by ducts 32 to the oil space 33 in supporting means 1. At the control station B, where holding plate 14 is retracted, a spring-loaded cover 53 closes duct 32, as shown in FIG. 2.

Instead of the hydraulic operating means for actuating holding plate 14, a mechanical operating means may be provided, as shown in FIG. 9. The operating member 39 is provided with a slanted face cooperating with a corresponding slanted face of holding plate 14, so that the same is moved to the workpiece holding position when operating member 39 is moved downward. A second operating member 38 is provided with inclined faces cooperating with corresponding inclined faces of the first operating member 39, so that member 39 is pulled down when operating member 38 is in the illustrated outwardly located position in which it is held by spring 37. Consequently, holding plate 14 is in the workpiece holding position while passing the working stations, but when each holding means passes the control station, cam 34 engages the cam follower portion of operating member 38, and pushes the same inwardly so that operating member 39 is moved upwardly, and holding plate 14 is free to move in outward direction under the action of spring 36.

As shown in FIG. 2, a manually operated member 40 can be inserted into bores of a cover plate 60 on the supporting means 2. When member 40 is engaged by the head of any member 30, the same is pushed in so that the holding plate 14 can be released at any desired point.

The flat workpiece 11 is not only clamped between the confronting edges of holding plates 13 and 14, but is also supported from below by the head of a work support 10 whose lower end abuts a tubular member 44 having a threaded portion 48 screwed into a corresponding threaded bore of table 3. A hollow piston 42 surrounds members 10 and 44 and carries leaf springs 43 which abut a shoulder in member 10. A spring 41 urges the hollow piston 42 down. The tubular threaded member 44 has a lower end resting on a guideway 49 on a horizontal surface of supporting means 2, as best seen in FIG. 7. Each tubular member 44 has a projecting cam follower arm 45 cooperating with a cam 47 at the control station under the action of springs 46.

Cam follower arms 45 are urged by the springs 46 to a position in which the threaded member 44 is raised by its thread 48 to a position urging workpiece support 10 to a raised position supporting workpiece 11. At the same time, hollow piston 42 is raised through springs 43, so that spring 41 is compressed, and tends to move workpiece support 10 downwardly. When a cam follower lever 45 passes control cam 47 between the last and the first working station, and at the control station, arm 45 is turned, so that threaded member 44 is also turned and is moved downward by its thread 48.

As explained above, the lower end of threaded member 44 slides on a guideway 49 while member 44 holds workpiece support 10 in the workpiece supporting position, and in order to permit the downward movement of members 44 in the region of the control station, guideway 49 is provided with a recessed portion 49a extending between the last working station A and the first working station C, as best seen in FIG. 7. Cam 47 releases the respective follower lever 45 between the control station B and the first work station C, so that spring 46 returns the respective lever and member 44 to its normal angular position in which member 44 and support 10 are raised.

Consequently, the workpiece support is located in a lower position when a finished workpiece is removed at the control station and replaced by a new workpiece. When holding plate 14 has been moved to the workpiece holding position thereof, workpiece support 11 returns to its workpiece supporting position pressing against the flat workpiece clamped between holding plates 13 and 14.

The pressure fluid in the annular groove 21 is supplied through a duct 50 to the cylinder spaces 51 of the work table 3 in which the hollow pistons 42 are slidably mounted. When pressure fluid enters space 51, piston 42 is moved upward, compressing spring 41, and also raising leaf springs 43 which are spread apart by the thicker portion of support 10 and release the same. In this position of leaf springs 43, the workpiece support 10 can be removed from the top of table 3 after retraction of holding plate 14. In this manner, each workpiece support 10 can be replaced by another workpiece support suited for another workpiece. When clamping plates 15a are raised, as described above, holding plates 13 and 14 can also be changed if different workpieces are to be machined on the work table.

It is advantageous to simultaneously relieve holding plate 14 and workpiece support 10 so that the same may be removed from the machine, and exchanged for other corresponding pieces. For this purpose, valve means, not shown, are provided which simultaneously supply pressure fluid to the annular groove 21, and relieve the annular groove 28 so that there is no pressure in space 25, as explained with reference to FIG. 5, permitting removal of holding plate 14. When plates 13, 14 and workpiece support 10 are replaced, and new workpieces are inserted, the valve means are again operated to relieve the pressure in annular groove 21 and to provide pressure in annular groove 28.

The oil in the spaces below holding plates 13 and 14 has a small, adjustable pressure, and serves for cleansing the guide faces on the top of table 3 on which holding plates 13 and 14 rest. Also, gaps between the workpiece and the edges of plates 13 and 14 are rinsed, and the sliding faces of members 10 and 27 are lubricated. In order to prevent loss of oil at the control station where the holding plate 14 is opened, a cover 53 closes duct 32 at the control station B.

An ejector pin 59 is slidable in each tubular threaded member 44, and has a lower end sliding on a guideway 59a in the form of a narrow groove between two lateral portions of guideway 49, as best seen in FIGS. 2 and 7. Guideway 59a has a projection 58 located between the control station B and the first work station A. When a pin 59 passes over projection 58, it is raised, and pushes workpiece holder 10 upwards. Since in this position of the table 3, cam 34 is effective to release the holding plate 14, the workpiece is ejected by workpiece support 10. A stream of oil flows over table 3 in this position, and sweeps the ejected workpieces onto cover 60 from which they are removed. The same stream of oil removes shavings, and lubricates the workpiece.

The worktable 3 is normally slightly raised by springs 9 so that work table 3 can freely turn when the holding means are to be shifted between successive work stations. While the tools perform operations on workpieces held by the several holding means, pressure fluid is supplied through a duct 54 to the gap 55 between supporting means 2 and table 3, so that table 3 is pressed down on rollers 7 until springs 9 are compressed to such an extent that the table rests on a corresponding surface of supporting means 1 and is blocked at a desired level. When the table is to be turned, the pressure of the operating fluid is relieved in the annular gap between surfaces 55 and 56, and in duct 54 so that springs 9 raise the table again. The table may also be lowered by electro-magnetic means 57, controlled by suitable switches, not shown.

The shifting of the table is preferably accomplished by a hydraulically braked pneumatic piston operating a latch, not shown, controlled by stops 61 secured to the table 3, see FIG. 3. Stops 61 also serve for arresting the table.

The embodiment described with reference to FIGS. 1 to 9 has an annular rotary table 3.

Figure 10:
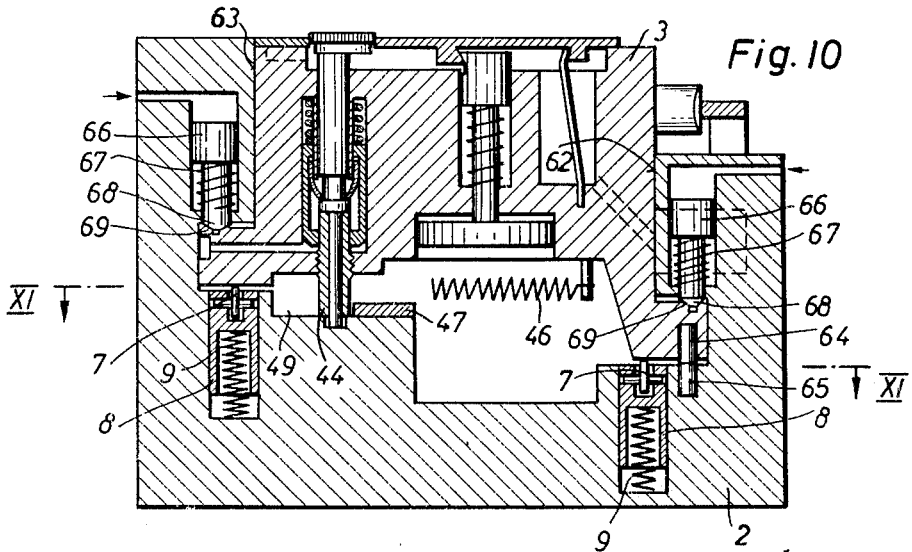
FIG. 10 is a sectional view taken on line X—X in FIG. 11 and illustrating another embodiment of the invention.
Figure 11:
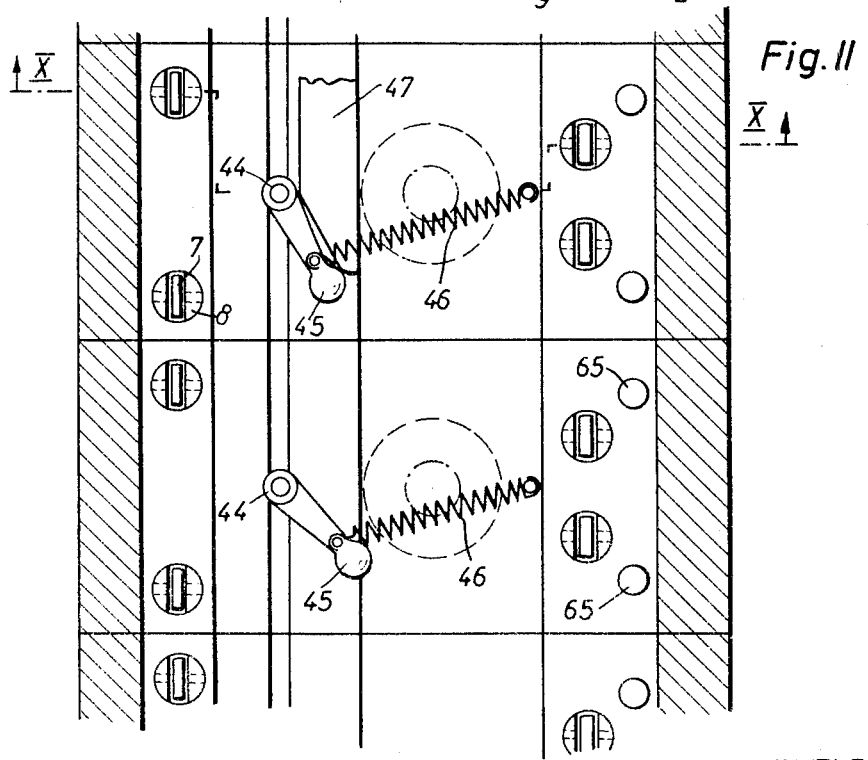
FIG. 11 is a sectional view taken on line XI—XI in FIG. 10.

In the embodiment of FIGS. 10 and 11, the table 3' is divided into rectangular sections which move along a straight path, and which respectively correspond to sector-shaped portions of the circular table provided in the embodiment of FIG. 1.

The lateral ball bearings 4 are omitted, and the sectors are guided in the supporting means by the surfaces 62 and 63. Two rows of resilient means 8, 9 having rollers 7 are provided in supporting means 2' and support table 3'. Every section is constructed as described with reference to sectors of the embodiment of FIG. 1, and control cams 47 and 34, not shown, are provided for controlling the actuation of the work supports and holding means. Support bolts 64 in each section rest on corresponding support bolts 65 in supporting means 2' to counterbalance the pressure between member 44 and guideway 49. The sectors are pressed down by the force of a pressure fluid introduced through ducts into cylinder spaces receiving pistons 66 which are loaded by springs 67. A conical portion 68 on each piston 66 engages a corresponding conical recess 69 upon operation of each piston 66, so that the position of the sections at the working stations is exactly determined.

It will be understood that each of the elements described above, or two or more together, may also find a useful application in other types of tool holder arrangements differing from the types described above.

While the invention has been illustrated and described as embodied in a working table having automatically controlled work piece holding means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, supporting means; a support mounted on said supporting means for movement along a path; a plurality of holding means for holding flat workpieces at their outlines and being mounted on said support for movement with the same, each holding means being movable between at least one workpiece holding position and a workpiece releasing position; a plurality of workpiece supports for supporting said flat workpieces, said workpiece supports being movable transversely to the plane of said flat workpieces and being mounted on said support for movement with the same; and control means mounted on said supporting means in the region of said path so as to be successively passed by each of said holding means and workpiece supports during movement of said support so that said holding means are moved from one of said positions thereof to the other of said positions thereof and said workpiece supports are moved transversely to said plane when passing said control means.

2. In a machine tool, in combination, supporting means; a work table mounted on said supporting means for movement relative to the same; a plurality of holding means for holding flat workpieces at their outlines and being mounted on said work table for movement with the same, each holding means including at least one first holding plate fixed on said table and at least one second holding plate mounted on said table for movement in a plane toward and away from said first holding plate between a workpiece holding position and a workpiece releasing position; means urging said second holding plate to said workpiece releasing position; a plurality of workpiece supports mounted on said table for movement with the same, said workpiece supports being movable transversely to said plane; and control means mounted on said supporting means in the region of said path so as to be successively passed by each of said holding means and by each of said workpiece supports during movement of said work table, said control means actuating each holding means and workpiece support passing the same in such a manner that said second holding plate moves to said workpiece releasing positions permitting removal of a workpiece held by said holding means, and that said workpiece support move transversely to said plane.

3. In a machine tool, in combination, supporting means; a work table mounted on said supporting means for movement relative to the same; a plurality of holding means for holding flat workpieces at their outlines and mounted on said work table for movement with the same, each holding means including at least one first holding plate fixed on said table and at least one second holding plate mounted on said table for movement in a plane toward and away from said first holding plate between a workpiece releasing position and a workpiece holding position; a plurality of workpiece supports respectively located in the region of said holding plates and being mounted on said table for movement with the same, said workpiece supports being movable transversely to said plane; a plurality of first operating means for operating said second holding plates to move between said positions thereof; each first operating means having a first cam follower portion, all said first cam follower portions moving along a first path during movement of said table; means controlling said first operating means to hold said second holding plate in said workpiece holding position; a plurality of second operating means movably mounted on said table, each second operating means being operatively connected to one of said workpiece supports and being shiftable to an actuated position for moving the respective workpiece support transversely to said plane, said second operating means including second cam follower portions movable along a second path during movement of said table; first cam means mounted on said supporting means at one point of said first path so as to successively engage said first follower portions whereby said second holding plate of each holding means is moved to said workpiece releasing position; and second cam means mounted on said supporting means at one point of said second path so as to successively engage said second cam follower portions to shift said second operating means to said actuated position, said first and second cam means being arranged at a station in such a manner that the workpieces can be successively removed from said holding means at said station.

4. A machine tool as set forth in claim 3 wherein each of said first operating means includes a first operating member operatively connected to said second holding plate so that said second holding plates of said holding means are forced against said first holding plates and against said work table, and a second operating member having a cam face engaging said first operating member and having said first cam follower portion; and wherein said first cam means includes a stationary cam successively engaging said first cam follower portions of said second operating members for shifting the same whereby said first operating member is shifted to effect movement of said second holding plate to said workpiece releasing position.

5. A machine tool as set forth in claim 3 and including a plurality of clamping plates respectively located between said holding means, each clamping plate being movable between a clamping position for clamping adjacent first and second holding plates in said workpiece holding position, and an inoperative position; biasing means for urging said clamping plates to said clamping position; and means including a piston connected to each clamping plate for moving the same to said inoperative position.

6. A machine tool as set forth in claim 3 wherein each second operating means includes a turnable threaded member and having said second cam follower portion engaged by said second cam means in such a manner that said threaded member is turned for effecting transverse movement of the respective workpiece support.

7. A machine tool as set forth in claim 3 wherein said supporting means includes a base, and a plurality of resilient supports mounted on said base, each resilient support including a member slidably mounted in said base, a spring urging said last mentioned member upwards, and a support roller turnably mounted on said last mentioned member, said work table resting on said support rollers and being held by said springs spaced from said base; and pressure means operable to press said table downwardly to a position abutting said base while said springs are compressed.

8. A machine tool as set forth in claim 3 wherein said work table has inner spaces in the region of said holding plates, and means for supplying oil to said spaces so that the oil passes through gaps between said holding plates for cleaning the same.

9. A machine tool as set forth in claim 3 wherein said fixed holding plate has openings adapted to receive guide means mounted on a tool holder for exactly centering the same related to a workpiece.

10. A machine tool as set forth in claim 3 and including means for simultaneously moving said holding plates to said workpiece releasing positions thereof, and for moving said workpiece supports transversely to said plane to a position in which all said holding plates and workpiece supports may be simultaneously removed so as to be exchanged for corresponding elements adapted to cooperate with another workpiece.

11. A machine tool as set forth in claim 3 wherein said work table is a circular ring.

12. A machine tool as set forth in claim 3 wherein said work table comprises a plurality of sections, each of said sections supporting a holding means and a workpiece support, and first and second operating means, said sections being guided by said supporting means for movement along a straight path.

13. A machine tool as set forth in claim 3 wherein each first operating means includes a hydraulic piston operatively connected to said second holding plate, and valve means for controlling the flow of an operating fluid to said hydraulic piston.

14. A machine tool as set forth in claim 5 wherein said biasing means includes a wedge member engaging said piston, and means urging said wedge member to a position in which said piston holds said clamping plate in said clamping position.

15. A machine tool as set forth in claim 6 wherein said supporting means has a guideway engaged by one end of said threaded member during movement of said table, said guideway having a recessed portion in the region of said second cam means to permit axial movement of said threaded member when turned by said cam follower lever.

16. A machine tool as set forth in claim 6 wherein said table is formed with a hydraulic cylinder in the region of each workpiece support; spring-loaded pistons surrounding said workpiece supports, respectively, and located in each of said cylinders; spring means connecting each piston with the respective workpiece support whereby each workpiece support is normally held on said table; and means for supplying an operating fluid to said cylinders whereby each workpiece support can be removed from said table when the respective piston and spring means are shifted by the hydraulic fluid to a position in which said spring means release said workpiece support.

17. A machine tool as set forth in claim 15 wherein said supporting means has another guideway extending along said guideway and having a projecting portion in the region of said recessed portion of said first mentioned guideway; wherein said threaded member is tubular; and including a pin passing through said tubular threaded member and having one end engaging said workpiece support and another end sliding on said other guideway during movement of said table whereby said workpiece support is moved to a workpiece ejecting position when said pin moves over said projecting portion of said other guide way.

18. A machine tool as set forth in claim 7 wherein said pressure means includes pressure chambers and means for supplying a pressure fluid to said pressure chambers.

19. A machine tool as set forth in claim 7 wherein said pressure chambers are formed between said base and said work table.

20. A machine tool as set forth in claim 8 and including piston means in said pressure chambers having portions for engaging said work table so that the work table is pressed down and arrested.

21. A machine tool as set forth in claim 9, and including spring-loaded bolts for closing said openings in said fixed holding plate.

22. A machine tool as set forth in claim 12 wherein said second operating means of each section includes an operating member sliding on said supporting means and supporting said workpiece support; and cooperating support and abutment members on said section and on said supporting means for counterbalancing the pressure exerted by said operating member on the respective section.

References Cited in the file of this patent
UNITED STATES PATENTS

| | | |
|---|---|---|
| 941,543 | Sistek | Nov. 30, 1909 |
| 1,775,381 | Angus | Sept. 9, 1930 |
| 1,842,147 | Cardner | Jan. 19, 1932 |
| 1,909,681 | Jackson | May 16, 1933 |
| 2,337,528 | Stuckert | Dec. 21, 1943 |